United States Patent
Mishra et al.

(10) Patent No.: US 9,525,701 B2
(45) Date of Patent: *Dec. 20, 2016

(54) SERVER WITH MECHANISM FOR CHANGING TREATMENT OF CLIENT CONNECTIONS DETERMINED TO BE RELATED TO ATTACKS

(71) Applicant: Akamai Technologies, Inc., Cambridge, MA (US)

(72) Inventors: Sudhin Mishra, San Jose, CA (US); Stephen L. Ludin, Mill Valley, CA (US); Philip A. Lisiecki, Santa Barbara, CA (US); Erik Nygren, Somerville, MA (US); John A. Dilley, Los Altos, CA (US); Karl-Eliv J. Hallin, Santa Clara, CA (US); Joshua Hunt, Mandeville, LA (US)

(73) Assignee: AKAMAI TECHNOLOGIES, INC., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/521,370

(22) Filed: Oct. 22, 2014

(65) Prior Publication Data

US 2015/0040221 A1    Feb. 5, 2015

Related U.S. Application Data

(63) Continuation of application No. 13/837,140, filed on Mar. 15, 2013, now Pat. No. 8,875,287.

(Continued)

(51) Int. Cl.
*H04L 29/06* (2006.01)
*H04L 12/911* (2013.01)
*H04L 12/815* (2013.01)

(52) U.S. Cl.
CPC .......... *H04L 63/145* (2013.01); *H04L 47/22* (2013.01); *H04L 47/70* (2013.01); *H04L 63/1458* (2013.01); *H04L 63/0227* (2013.01)

(58) Field of Classification Search
None
See application file for complete search history.

(56) References Cited

U.S. PATENT DOCUMENTS

| 5,774,660 A | 6/1998 | Brendel et al. |
| 6,108,703 A | 8/2000 | Leighton et al. |

(Continued)

FOREIGN PATENT DOCUMENTS

| KR | 10-2001-0055926 | 7/2001 |
| KR | 10-2011-0028106 | 3/2011 |
| WO | 2008118608 A1 | 10/2008 |

OTHER PUBLICATIONS

Engelhardt, Jan, "An Introduction to Xtables-addons", presentation at NFWS 2008, dated Sep. 30, 2008, 43 pages.

(Continued)

*Primary Examiner* — Hadi Armouche
*Assistant Examiner* — Malcolm Cribbs

(57) ABSTRACT

According to certain non-limiting embodiments disclosed herein, the functionality of a server is extended with a mechanism for identifying connections with clients that have exhibited attack characteristics (for example, characteristics indicating a DoS attack), and for transitioning internal ownership of those connections such that server resources consumed by the connection are reduced, while keeping the connection open. The connection thus moves from a state of relatively high resource use to a state of relatively low server resource use. According to certain non-limiting embodiments disclosed herein, the functionality of a server is extended by enabling the server to determine that any of a client and a connection exhibits one or (Continued)

more attack characteristics (e.g., based on at least one of client attributes, connection attributes, and client behavior during the connection, or otherwise). As a result of the determination, the server changes its treatment of the connection.

10 Claims, 8 Drawing Sheets

Related U.S. Application Data

(60) Provisional application No. 61/709,370, filed on Oct. 4, 2012.

(56) References Cited

U.S. PATENT DOCUMENTS

| | | | |
|---|---|---|---|
| 6,182,139 | B1 | 1/2001 | Brendel |
| 6,820,133 | B1 | 11/2004 | Grove et al. |
| 7,111,057 | B1 | 9/2006 | Sherman et al. |
| 7,240,100 | B1 | 7/2007 | Wein et al. |
| 7,274,658 | B2 | 9/2007 | Bornstein et al. |
| 7,296,082 | B2 | 11/2007 | Leighton et al. |
| 7,373,416 | B2 | 5/2008 | Kagan |
| 7,376,716 | B2 | 5/2008 | Dilley et al. |
| 7,472,178 | B2 | 12/2008 | Lisiecki et al. |
| 7,596,619 | B2 | 9/2009 | Leighton et al. |
| 7,607,062 | B2 | 10/2009 | Grove et al. |
| 7,650,427 | B1 | 1/2010 | Liu et al. |
| 7,660,296 | B2 | 2/2010 | Fletcher et al. |
| 7,698,458 | B1 | 4/2010 | Liu et al. |
| 8,176,203 | B1 | 5/2012 | Liu et al. |
| 8,225,377 | B2 | 7/2012 | Maffione et al. |
| 8,341,295 | B1 | 12/2012 | Liu et al. |
| 8,423,662 | B1 | 4/2013 | Weihl et al. |
| 8,473,635 | B1 | 6/2013 | Lohner et al. |
| 8,578,052 | B1 | 11/2013 | Liu et al. |
| 8,688,817 | B2 | 4/2014 | Hartrick et al. |
| 8,819,280 | B1 | 8/2014 | Liu et al. |
| 8,875,287 | B2 | 10/2014 | Ludin et al. |
| 8,918,539 | B2 | 12/2014 | Lohner et al. |
| 2003/0145226 | A1 | 7/2003 | Bruton, III et al. |
| 2005/0254519 | A1 | 11/2005 | Beukema et al. |
| 2006/0075084 | A1 | 4/2006 | Lyon |
| 2006/0143620 | A1 | 6/2006 | Elms et al. |
| 2006/0272025 | A1 | 11/2006 | Mononen |
| 2007/0226375 | A1 | 9/2007 | Chu et al. |
| 2008/0046964 | A1 | 2/2008 | Muralidharan |
| 2008/0062879 | A1 | 3/2008 | Sivakumar et al. |
| 2008/0133749 | A1 | 6/2008 | Sample |
| 2008/0144504 | A1 | 6/2008 | Marcondes et al. |
| 2008/0240144 | A1 | 10/2008 | Kruse et al. |
| 2008/0256623 | A1 | 10/2008 | Worley et al. |
| 2009/0007266 | A1 | 1/2009 | Wu et al. |
| 2009/0172162 | A1 | 7/2009 | Wood et al. |
| 2011/0099622 | A1 | 4/2011 | Lee et al. |
| 2011/0173345 | A1 | 7/2011 | Knox et al. |
| 2011/0225647 | A1 | 9/2011 | Dilley et al. |
| 2011/0320617 | A1* | 12/2011 | Annamalaisami .. H04L 63/1458 709/228 |
| 2012/0036272 | A1 | 2/2012 | El Zur |
| 2012/0093150 | A1 | 4/2012 | Kini |
| 2012/0117267 | A1 | 5/2012 | Holloway et al. |
| 2012/0150993 | A1 | 6/2012 | Flack et al. |
| 2012/0265853 | A1 | 10/2012 | Knox et al. |
| 2013/0254343 | A1 | 9/2013 | Stevens et al. |
| 2014/0101758 | A1 | 4/2014 | Ludin et al. |
| 2015/0281367 | A1 | 10/2015 | Nygren et al. |

OTHER PUBLICATIONS

Chris Lowth, "Kernel Korner—The Hidden Treasures of iptables", Linux Journal, Apr. 1, 2004.

Chris Lowth, "The Hidden Treasures of iptables", available at http://www.lowth.com/howto/iptables-treasures.php, dated Apr. 2004.
"Netfilter/iptables—Patch-o-Matic Listing—external", copyright date for page listed as 1999-2010, available at http://www.netfilter.org/projects/patch-o-matic/pom-external.html, 6 pages.
Man page for tarpit extension for xtables-addons release 1.45, available at http://sourceforge.net/p/xtables-addons/xtables-addons/ci/v1.45/tree/extensions/libxt_TARPIT.man, dated May 31, 2011, 2 pages.
Xtables-addons file listing for release 1.45, available at http://sourceforge.net/p/xtables-addons/xtables-addons/ci/v1.45/tree/, downloaded Jun. 26, 2013, 3 pages.
Xtables-addons page, referring to version 1.27, dated Feb. 5, 2011, available at http://xtables-addons.sourceforge.net/modules.php, 1 page.
U.S. Appl. No. 13/471,079, titled 'Server With Message Exchange Accounting', filed May 14, 2012.
International Search Report for counterpart PCT Application No. PCT/US2013/062115, mailed on Jan. 28, 2014, 5 pages.
Written Opinion for counterpart PCT Application No. PCT/US2013/062115, mailed on Jan. 28, 2014, 4 pages.
Machine Translation from KIPO for KR-10-2001-0055926 (not reviewed for accuracy or completeness).
Machine Translation from KIPO for KR-10-2011-0028106 (not reviewed for accuracy or completeness).
U.S. Appl. No. 13/837,140, filed Mar. 15, 2013.
A.C. Snoeren et al., TCP Connection Migration, <draft-snoeren-tcp-migrate-00.txt>, IETF Internet Draft Nov. 2000, 13 pages.
Alex C. Snoeren and Hari Balakrishnan, TCP Connection Migration, MIT Lab for Computer Science, Jun. 26, 2000, 12 pages.
Jonathan Corbet, TCP Connection Repair, LWN.net, May 1, 2012, available at https://lwn.net/Articles/495304/.
Massimo Bernaschi et al., "SockMi: a solution for migrating TCP/IP connections", 15th EUROMICRO International conference on Parallel, Distributed and Network-Based Processing, 2007 IEEE Publication. PDP '07. pp. 221-228.
Livadariu, Ioana, et al., "Leveraging the IPv4/IPv6 Identity Duality by using Multi-Path Transport" In Proceedings of the 18th IEEE Global Internet Symposium (GI). Hong Kong/People's Republic of China, 2015; at https://www.simula.no/sites/www.simula.no/files/publications/files/gis2015_0.pdf (available online at least as early as Mar. 25, 2015).
U.S. Appl. No. 14/252,640.
M. Bagnulo, Threat Analysis for TCP Extensions for Multipath Operation with Multiple Addresses, IETF RFC 6181, Mar. 2011.
A. Ford, Architectural Guidelines for Multipath TCP Development, IETF RFC 6182, Mar. 2011.
C. Raiciu, Coupled Congestion Control for Multipath Transport Protocols, IETF RFC 6356, Oct. 2011.
A. Ford, TCP Extensions for Multipath Operation with Multiple Addresses, IETF RFC 6824, Jan. 2013.
M. Scharf, Multipath TCP (MPTCP) Application Interface Considerations, IETF RFC 6897, Mar. 2013.
M. Scharf, Multipath TCP (MPTCP) Application Interface Considerations, <draft-ietf-mptcp-api-07> IETF Internet draft, Jan. 19, 2013.
TCP Connection web page, available at www.criu.org/TCP_connection, accessed Mar. 31, 2015, last modified Feb. 26, 2015.
Transcript of TCP Repair Overview, presentation given by Pavel Emelianov at Linux Plumber's Conference 2013, Sep. 18-20, 2013, New Orleans, Louisiana; video of presentation available at https://www.youtube.com/watch?v=lkH7p2jmxok.
Screenshots of TCP Repair Overview, presentation given by Pavel Emelianov at Linux Plumber's Conference 2013, Sep. 18-20, 2013, New Orleans, Louisiana; video of presentation available at https://www.youtube.com/watch?v=lkH7p2jmxok.
X. Wei et al., MPTCP proxy mechanisms, draft-wei-mptcp-proxy-mechanism-01, IETF draft, Mar. 9, 2015.
X. Wei et al., MPTCP proxy mechanisms, draft-wei-mptcp-proxy-mechanism-00, IETF draft, Jun. 30, 2014.

(56) References Cited

OTHER PUBLICATIONS

L. Deng et al., Use-cases and Requirements for MPTCP Proxy in ISP Networks, draft-deng-mptcp-proxy-00, MPTCP Working Group IETF, Informational Internet Draft, May 29, 2014.
L. Deng et al., Use-cases and Requirements for MPTCP Proxy in ISP Networks, draft-deng-mptcp-proxy-01, MPTCP Working Group IETF, Informational Internet Draft, Oct. 24, 2014.
L. Deng et al., MPTCP Proxy for Mobile Networks, draft-deng-mptcp-mobile-network-proxy-00, MPTCP Working Group IETF, Informational Internet Draft, Feb. 14, 2014.
Extended European Search Report and office action for counterpart EU Application 13844424.5, mailed Mar. 2, 2016, 7 pages.
Non-final Office Action for U.S. Appl. No. 15/253,059 (continuation of instant applicant) issued on Oct. 6, 2016, 23 pages.

\* cited by examiner

SERVER WITH MECHANISM FOR CHANGING TREATMENT OF CLIENT CONNECTIONS DETERMINED TO BE RELATED TO ATTACKS

This application is a continuation of U.S. application Ser. No. 13/837,140, filed Mar. 15, 2013, which is based on and claims the benefit of priority of U.S. Provisional Application No. 61/709,370, filed Oct. 4, 2012. The disclosures of all of the foregoing applications are hereby incorporated by reference in their entireties.

BACKGROUND

Technical Field

This application generally relates to client-server data processing systems, to the delivery of content over computer networks, to systems and methods for conserving server resources, and to systems and method for handling computer-based attacks.

Brief Description of the Related Art

Computer-based attacks are an increasing problem for servers that provide remote services, such as cloud storage and web applications, that serve websites, or that provide other online solutions.

In a typical denial of service (DoS) attack, for example, an attacker attempts to disrupt the operation of a target server such that the target server cannot provide an acceptable quality-of-service to legitimate clients. Such attacks are a significant problem, as an outage at a website may cause considerable interruptions to the services provided by web applications, loss of revenue for e-commerce businesses, as well as negative publicity.

In one kind of DoS attack, an attacker (via their own computer or a set of conscripted computers often referred to as 'bots') sends a high volume of requests to a target server. Eventually, the target server is unable to respond to the volume of requests, resulting in slow performance or an outright failure.

Another kind of DoS attack is a 'slow' DoS attack. Generally, in such attacks an attacker attempts to tie up its resources by interacting with a target server in an artificially slow fashion. One kind of slow attack is known as a slow 'GET' attack (aka Slow Loris), in which an attacker slowly sends the headers that make up an HTTP 'GET' request. The target server dutifully waits for the attacker to complete the GET request. Normally, the server would receive the entire GET request, process it, and move on to other requests, closing the connection and releasing associated resources allocated to the connection. But the attacker's slow GET request delays or prevents this from happening, tying up the server's memory, processing and other resources allocated to the connection. It thus impacts the target server's ability to service other, legitimate clients. Oftentimes, an attacker will seek to open a large number of such bogus connections with intentionally slow requests, multiplying the effect of the attack. A single web client can hold open hundreds to thousands of such connections, each one sending only a few bytes of data each second. Another kind of slow attack is a slow 'POST' attack, in which an attacker sends an HTTP POST message body at a low data rate, forcing the target server to hold open the client connection for an extended period of time as it waits for the message body to complete, leading to the same resource issues as with the slow 'GET' attack.

The goal of these attacks is to try to impact or exhaust server resources. Hence, there is a need for improved ways of conserving server resources in the face of such attacks and threats. There is also a need for improved ways of combating identified attacking clients and gathering information about them when they are encountered. Such improvements would be useful not only against known threats like DoS attacks, but against future resource-exhaustion attacks and moreover against any clients and/or connections that a server determines are behaving in an undesirable way. The teachings herein address these needs and offer other advantages, features, and uses that will become apparent in view of this disclosure.

BRIEF DESCRIPTION OF THE DRAWINGS

The teachings hereof will be more fully understood from the following detailed description taken in conjunction with the accompanying drawings, in which.

SUMMARY

Figure 1:
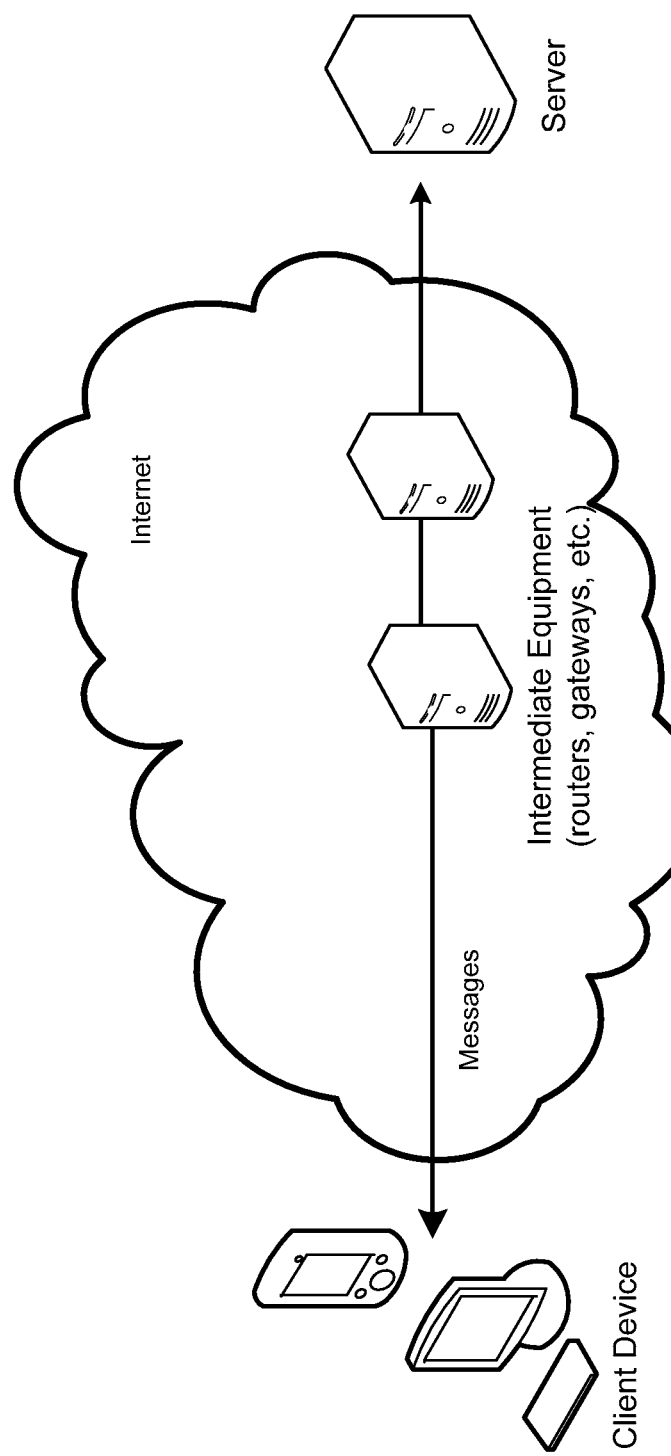
FIG. 1 shows an example of a client device communicating with a server over a computer communications network, in accordance with one embodiment of the invention.

According to certain non-limiting embodiments, the functionality of a server is extended with a mechanism for identifying connections with clients that have exhibited attack characteristics (for example, characteristics indicating a DoS attack), and for transitioning internal ownership of those connections such that server resources consumed by the connection are reduced, while keeping the connection open. The connection thus moves from a state of relatively high resource use to a state of relatively low server resource use, and the server is able to free resources such as memory and processing cycles previously allocated to the connection.

Preferably, the server uses the connection to keep the client occupied so that it does not launch—or has fewer resources to launch—further attacks, and possibly to log information about the client for later analysis. Hence, in one embodiment, the server keeps the connection alive, continuing to communicate with the client device as if the connection were being serviced, while actually ignoring or performing reduced processing on messages received on the connection. For example, the server may respond to transport-layer control messages to keep the connection open (e.g., sending TCP acknowledgements, etc.) while ignoring the client's application-layer messages. The server may also perform some minimal processing to log information about the client and/or the connection. Preferably, the result is that the attacking client believes that the connection is still valid for communicating with the server, and its resources are tied up with the connection, while in reality the server is using reduced resources to maintain the connection and ignoring or doing less processing with respect to the connection.

Eventually, the client may end the connection of its own volition, or the server may kill the connection to free up the remaining resources allocated to the connection, or for other reasons.

By way of further illustration, in one embodiment, a method executed by a server interacting with a client over one or more computer communications networks includes establishing a connection with a client over one or more computer communications networks (such as a TCP connection), receiving at least one message over the connection from the client, and determining that server resources allocated to the connection should be reduced. The determination may involve analyzing at least one of client attributes, connection attributes, and client behavior during the connection. The method further may include while keeping the connection open, reducing server resources (e.g., memory or processing resources) allocated to the connection. Further the method may include sending at least one message to the client over the connection after the reduction in server resources.

In some cases, the reduction of server resources involves transferring responsibility for the handling of messages arriving over the connection from a first program (e.g., an application such as an HTTP server application) to a second program (e.g., a kernel module or another application) executing in the server. After the transfer, the first program can reduce its resources previously allocated to the connection. The second program can send at least one message to the client over the connection after said transfer.

In another embodiment, a method executed by a server interacting with a client over one or more computer communications networks involves establishing a connection with a client over one or more computer communications networks; receiving at least one message over the connection from the client; during the time the connection is open, and determining that any of the client and the connection exhibits one or more attack characteristics (e.g., based on at least one of client attributes, connection attributes, and client behavior during the connection, or otherwise). As a result of the determination, the server changes its treatment of the connection such that the server thereafter (i) sends at least one transport-layer message to the client over the connection to keep the connection open, and (ii) does not send a response to application-layer messages received from the client. Subsequently the server or the client may close the connection.

In some cases, as a result of said determination, the server transitions responsibility for handling messages arriving via the connection from a first program to a second program, while keeping the connection open. The second program may send at least one transport-layer message to the client over the connection to keep the connection open, but does not send a response to application-layer messages received from the client.

In yet another embodiment, a method executed by at least one application running on a server that is communicating with a client over one or more computer communications networks involves establishing a connection with a client over one or more computer communications networks; receiving at least one message over the connection from the client; determining that server resources allocated to the connection should be reduced; and sending one or more communications to an operating system running in the server indicating that the at least one application is releasing ownership of the connection and that cause the operating system to transfer the connection to a surrogate program, rather than closing the connection. The method further may involve reducing server resources allocated to the connection, e.g., by clearing memory resources allocated for the application to keep state for the connection.

As those skilled in the art will recognize, the foregoing description merely refers to examples of the invention. It is not limiting and the teachings hereof may be realized in a variety of systems, methods, apparatus, and non-transitory computer-readable media. Further non-limiting embodiments of the invention will be described in more detail below.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

According to one embodiment, the functionality of a server is extended with a mechanism for identifying attacking clients or attack-related connections and for reducing server resources associated with those connections. This approach is sometimes referred to herein as "miniaturizing" or "minifying" the connection.

Preferably, putting a connection in a minified state enables the server to free at least some resources allocated to the connection, while keeping the connection open for at least some time period afterwards. Preferably, the server can continue to respond to the client in some fashion, giving at least the appearance that the server is providing at least some service or functionality on that connection, while in reality the server is effectively ignoring the connection and the connection is tying up the resources of the attacking client.

The teachings herein are useful in HTTP servers servicing HTTP client devices over a TCP/IP computer communications network, such as the Internet. However, they are not limited to such environments.

By way of introduction, FIG. 1 illustrates an exemplary client-server communication path across the Internet. The client is typically a computer, laptop, or mobile device, running a client application that understands and communicates with the server using known network protocols to obtain content desired by an end user operating the client device. A common example of a client application is a web browser that makes requests for and receives content from a web server using HTTP over TCP/IP protocols, though again such examples are set forth for illustrative purposes and are not limiting.

As is known in the art, a server typically uses a variety of internal techniques to identify and manage communications with a given client. For example, conventional TCP/IP and other networking approaches enable a server to use socket identifiers to identify endpoints of a communication path. Thus, a client socket may be designated by the combination of the client IP address and a port number, the port number being an identifier that the client device uses to distinguish amongst different communication flows in which it is participating. A client may use different ports for different communication flows within a given client application.

Likewise, a server socket can be designated by an IP address and port number. By way of example, well-known port numbers include port 80 (on which a server listens for HTTP traffic) and port 443 (on which a server listens for secure traffic using TLS/SSL traffic). For connection oriented protocols like transport control protocol (TCP), a server can use the combination of the client socket and server socket to uniquely identify a connection to a client. Using such connection identifiers, a server can manage connections to different clients and amongst multiple connections to the same client device. It should be understood that the foregoing is provided for illustration only and that a wide variety of connection identification and endpoint identification approaches may be used in accordance with the methods and systems disclosed herein.

Figure 2:
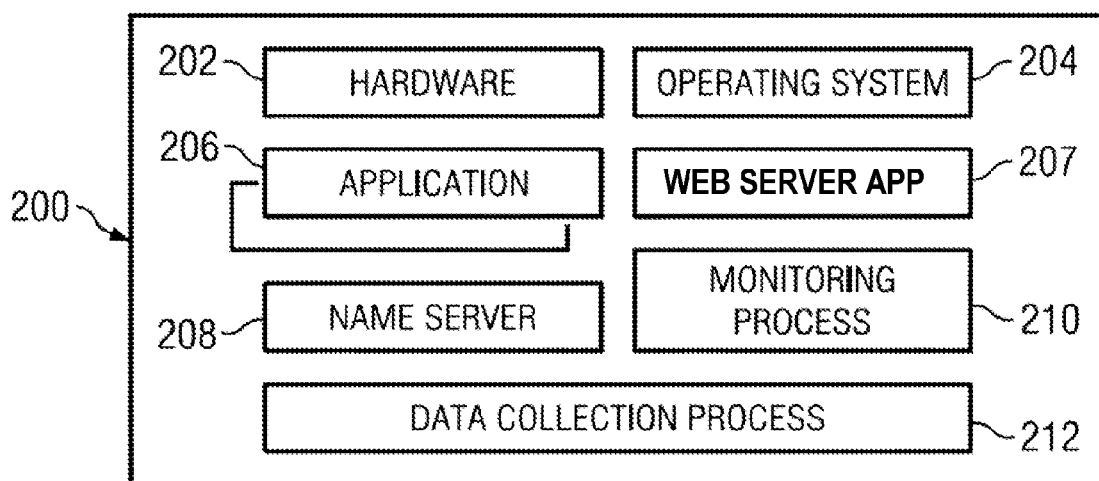
FIG. 2 is a schematic diagram of a server with components therein, in accordance with one embodiment of the invention.

FIG. 2 is a block diagram illustrating a computing machine configured as a server 200 which comprises commodity hardware 202 (e.g., one or more processors, memory, network interface cards, etc.) on which runs an operating system 204 with a kernel (such as Linux, Unix, Windows, etc.) that supports one or more applications 206a-n. To facilitate web content and other content delivery services, for example, the machine typically runs a set of applications, such as an HTTP server application 207, a name server application 208, a local monitoring process 210, a distributed data collection process 212, and the like. The HTTP server application 207 may include a manager process for managing a cache and delivery of content from the machine. For streaming media, the machine might include one or more media server applications, such as a Windows Media Server (WMS) or Flash 2.0 server, as required by the supported media formats. The machine 200 may be part of a distributed computing system such as a content delivery network (CDN), as will be described in more detail below, and as such may run an HTTP proxy that maintains a local cache of objects for retrieval and delivery to requesting clients. It should be understood, however, that the teachings hereof are not limited to CDNs or to HTTP servers.

To provide other solutions, including cloud and enterprise solutions, the machine 200 can be configured to run one or more applications that provide clients with remote data storage services, enterprise application services, gaming services, or otherwise.

Figure 3:
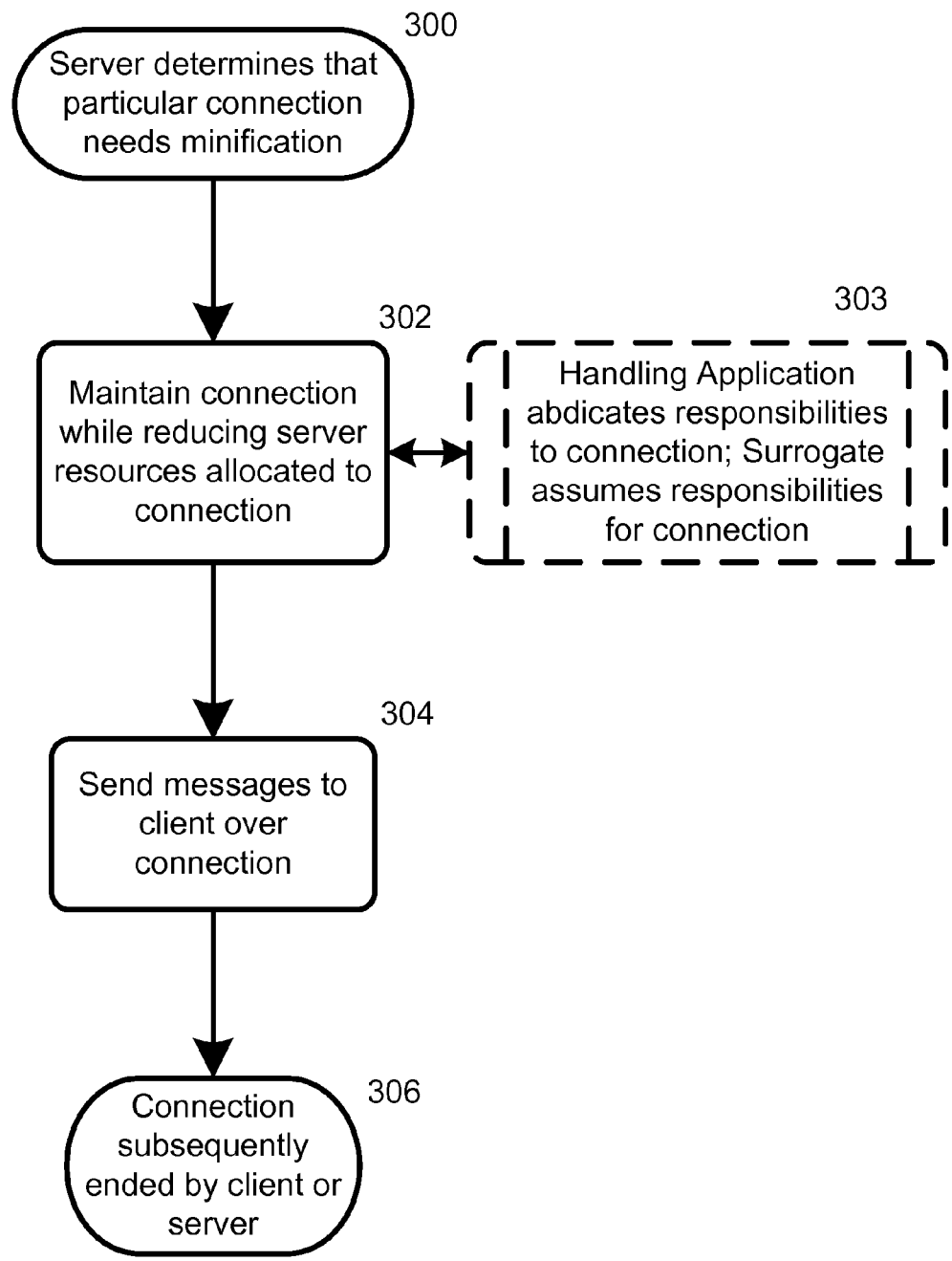
FIG. 3 is a flowchart showing an example of logic flow in the server shown in FIG. 2, in accordance with one embodiment of the invention.

FIG. 3 provides an example of a high-level logical flow within server 200 of FIG. 2, in accordance with one embodiment of the invention. In step 300, the server determines that a particular connection poses a problem and its impact on the server needs to be mitigated, e.g., because it has characteristics of an attack or threat. The server may make this determination based on a variety of factors. It may be based on, for example, (1) attributes of the client device (e.g., its IP address may be blacklisted or its geographic location may indicate a threat), (2) attributes of client messages (e.g., they may violate security/firewall rules, such as those available from a web application firewall), and/or (3) the behavior of the client device and/or connection. The behavior of the client device may be flagged because the client device is sending too much traffic (exceeding rate limits in the manner of a DoS attack, for example) or slowly sending traffic in the manner of a slow GET or POST attack. More information about monitoring and accounting for client traffic can be obtained from commonly-owned U.S. application Ser. No. 13/471,079, titled 'Server With Message Exchange Accounting' and filed May 14, 2012 (published as US Publication No. 2013/0254343), and from US Publication No. 2011/0225647, titled 'Cloud Based Firewall System and Service', the teachings of which are hereby incorporated by reference in their entirety.

In step 302, the server 200 reduces server resources allocated to the connection, such as server memory and processing resources. In one implementation, for example, once the server determines that the connection poses a problem, the server application that is handling the connection (the "handling application") gracefully abdicates its responsibilities to the connection, freeing resources within that application. The responsibilities abdicated by the handling application are transitioned to and assumed by a surrogate, such as another server application with a lighter resource footprint, or to particular operating system logic, for example. This will be described in more detail below in conjunction with FIG. 4, but is designated by subroutine 303 in FIG. 3.

In this implementation, the server reduces the resources allocated to the connection, but the server does not terminate or close the connection. Preferably, the server maintains the connection and continues to respond to at least some messages from the client over the connection. The server may provide little or no service on the connection beyond that necessary to keep the connection alive. In one implementation, this means that the server continues to provide network and transport layer responses, but does not provide application layer services (and indeed may simply ignore application layer messages). (Step 304.)

With the foregoing by way of overview, a more detailed embodiment is now described.

Figure 4:
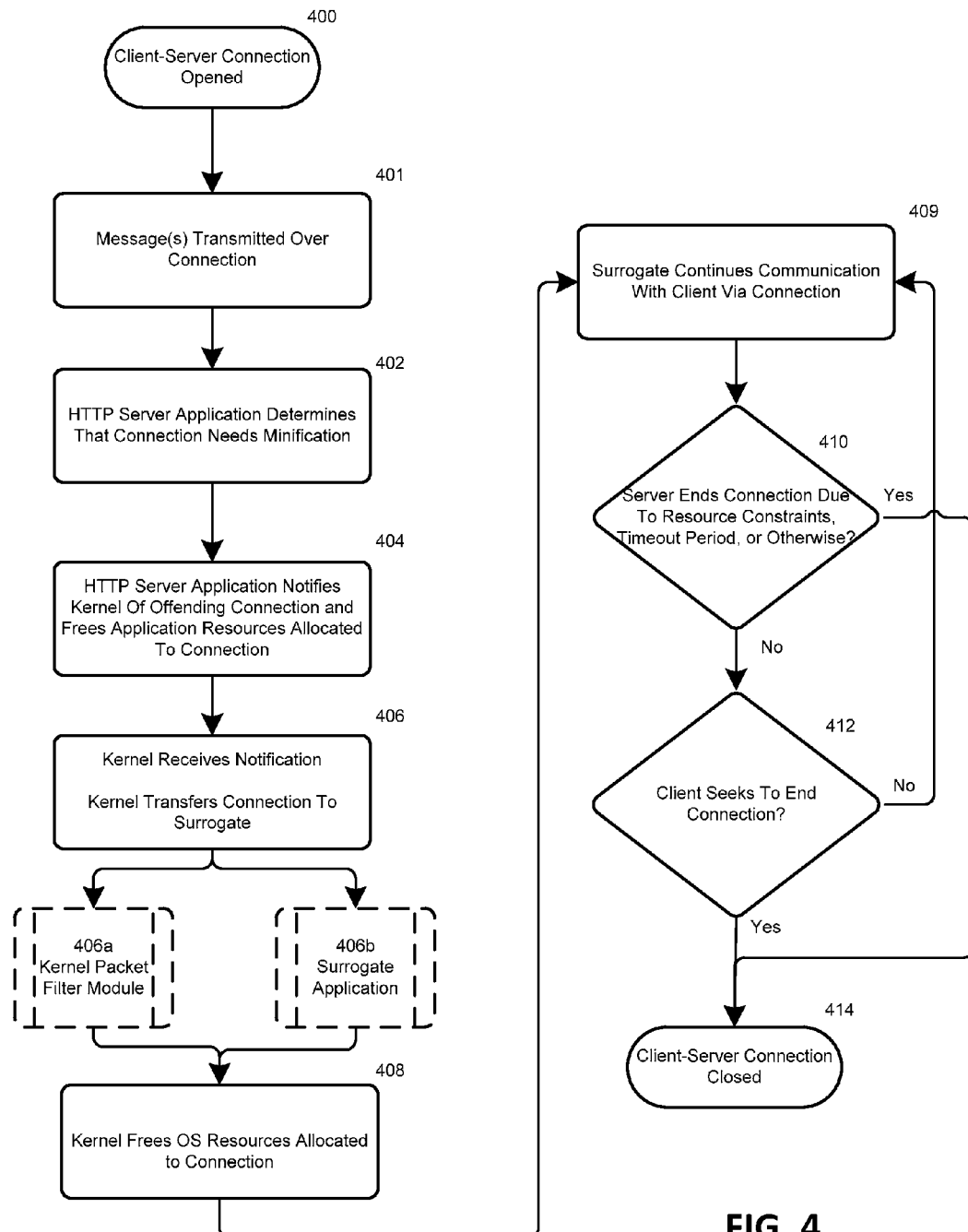
FIG. 4 is a flowchart showing an example of logic flow in the server shown in FIG. 2, in accordance with one embodiment of the invention.

FIG. 4 illustrates a more detailed logical flow operable in the server 200 in accordance with one embodiment of the invention. In step 400, the client-server connection is established. Assume for illustrative purposes that a client establishes a connection with the server using known TCP/IP protocols and handshaking, and subsequently sends to the server HTTP messages, such as requests for web content like an html file, image, video object, etc.

On the server side, to handle the new connection the operating system kernel 204 allocates memory internally to keep state for the connection and to store data related to the connection, and completes the TCP handshake with the client (e.g., according to TCP/IP protocols). The kernel notifies the HTTP server application 207 of the connection and passes it a file descriptor that identifies the client socket. The HTTP server application 204 reads the HTTP messages from the client. As with the kernel, the HTTP server application 207 establishes internal data structures to store data related to the connection, and so forth, consuming memory resources accordingly. The HTTP server application 207 may also need to retrieve user-configurable instructions, such as metadata instructions in a control file, that direct how the HTTP server is to handle the request. This also involves a memory and processing cost.

Once the connection is established, the client and server (via the HTTP server application 207) may communicate one or more HTTP messages. At some point during the communication session, assume the HTTP server application 204 determines that the connection is a threat or otherwise a problem and that the connection should be put into a minified state. (Step 402.) The server may make this determination based on any of a wide array of factors, as described previously.

In step 404, the HTTP server application 207 informs the kernel of the particular connection that should be put into a minified state. This can be accomplished, for example, via a system call that passes an appropriate connection identifier to the kernel. An example of a suitable connection identifier is the 4-tuple containing the client IP address, client port number, server IP address, and server port number, but any unique connection identifier can be used. Then, the application 207 performs a termination routine for the connection, releasing memory and other resources allocated to it, as if the connection were closed. The application 207 may log information about the client and/or connection for later use in analyzing the client and the circumstances surrounding the offending connection.

In step 406, the kernel 204 receives the notification from the HTTP server application 207. The kernel does not close the connection (e.g., it does not send a TCP FIN). Rather the kernel gives the connection to a surrogate that will serve as the new owner of the connection and as the endpoint for future messages with the client over the connection.

In one implementation (alternate step 406*a*), the surrogate is a packet filter in the kernel 204. For example, the kernel 204 can insert the identifying 4-tuple into a table associated with its packet filter so that future packets matching the 4-tuple are intercepted at the IP layer. This can be done by inserting the 4-tuple in a table entry used by the kernel's packet filter. The kernel checks incoming packets to see if they match an entry in the table. The packet filter preferably contains logic to respond to the client in order to keep the connection open and the client engaged for as long as possible. For example, the packet filter may send and respond to TCP messages (e.g., acknowledgements, keep-alives, window-sizing messages, sequence number updates, etc.). Acknowledgment and other response messages may be scheduled so as to introduce delay into the communication process. The packet filter may simply drop incoming packets after noting the information used to formulate a response, such as a timestamp and TCP sequence number. Packets that do not match the 4-tuple are passed for further processing in the kernel and up to the application associated therewith (assuming no other filtering rules were triggered). Known packet filters for the desired operating system (e.g., Windows, Linux, Unix, or other OS packet filter frameworks) may be modified in accordance with the teachings hereof to provide the foregoing functionality.

It should be noted that in alternate embodiments, the packet filter may drop packets from the minified connection (rather than attempting to respond to the client). Because the packet filter does not respond and also refrains from sending a TCP reset on the connection, the client can be kept engaged with an ostensibly open connection for longer than might otherwise be the case.

In another implementation (alternate step 406*b*), the kernel transfers ownership of the connection to another application, referred to as the surrogate application in FIG. 4. Subsequent messages on that connection are, accordingly, directed to the surrogate application. The surrogate application can be, for example, a user-space application that contains logic to respond to the client's messages as described previously with respect to the packet filter module, but that consumes fewer resources than the original handling application (the HTTP server application 207 in this example) to do so. The surrogate application can provide functionality to provide responses to the client, while ignoring most messages. For example, the surrogate application may contain logic that responds to client messages in order to keep the client engaged but also largely ignores or deletes data sent by the client and available on the socket. In some cases, the surrogate application may log the messages sent by the client or other information about the client. Further, in some cases, the surrogate may have logic that simulates aspects of an HTTP server application. The behavior of the surrogate application may be managed or configurable by a system administrator through a user interface, so that the server's handling of minified connections may be dynamically configured. Note that in some cases, the functions of the surrogate application may be implemented as a module within the HTTP server application 207.

Figure 5:
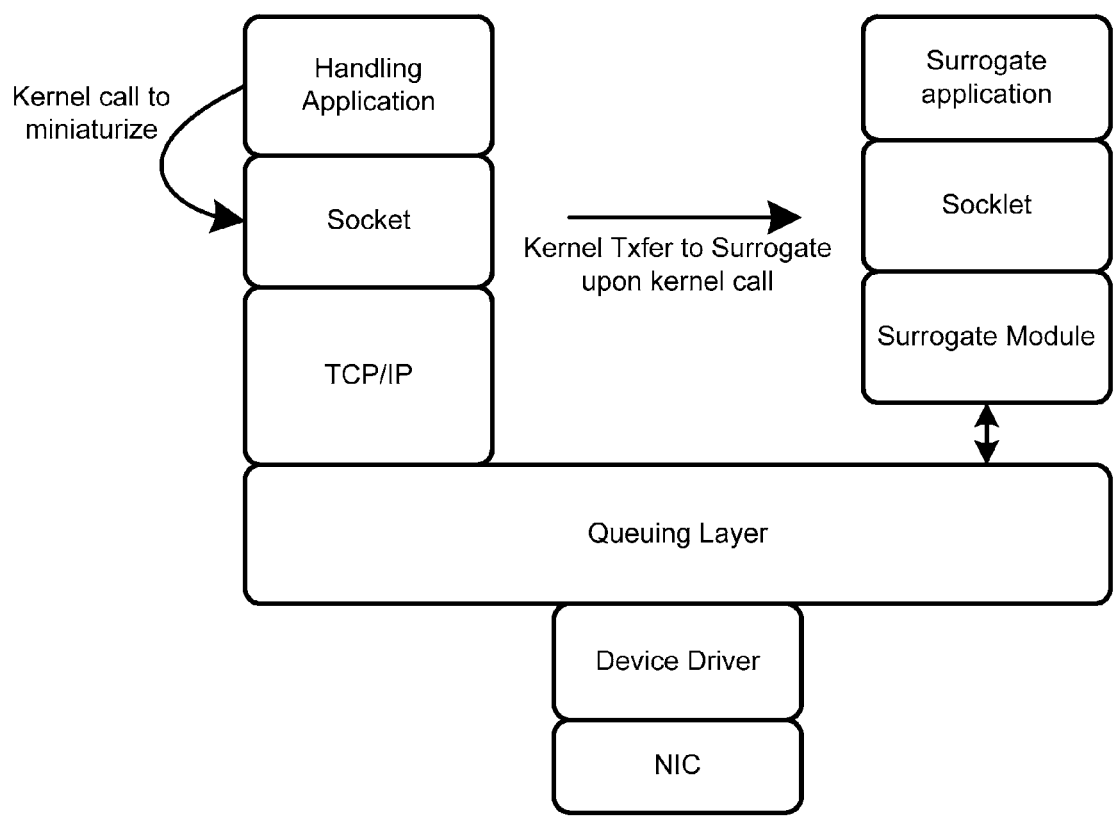
FIG. 5 is a schematic diagram illustrating the transfer of a connection to a surrogate, in accordance with one embodiment of the invention.

In yet another implementation (shown in FIG. 5), the surrogate application described above may be a user-space counterpart to a surrogate kernel module, where the kernel module implements the logic to keep the client engaged, while the surrogate application provides assistance for non-critical tasks, like computing delays to use in responding to client messages, and other support functionality, and providing a service interface to facilitate retrieval of connection statistics, debugging, testing, and the like. It may also provide an interface for a system administrator as described above. FIG. 5 illustrates the notion of transferring ownership of the connection to a combination of a surrogate application/module upon an appropriate system call. In this example, the surrogate kernel module intercepts the packets pertaining to the minified connection below the TCP/IP stack in the kernel, in the queuing layer, although this is not limiting.

In step 408, having arranged for a new owner for the connection, the kernel 204 frees as many resources as possible that are allocated to the connection, such as associated state information and queued send/receive buffers. The kernel may simply delete this data. Note that the implementation of 406*b* may require the kernel to retain some information in order to be able to service the surrogate user-space application.

In many cases, the server 200 keeps the minified connection open until the client closes it. (Step 410.) However, the server 200 may decide to close the connection itself (Step 412.) In particular, the server 200 may need to manage and at times reduce the number of minified connections. Preferably, the packet filter module and/or the surrogate application close minified connections when they represent a burden on the surrogate or the server generally. For example, there may be too many minified connections (e.g., the number of such connections exceed a threshold) or the server load is high (e.g., resource utilization exceeds a threshold), or resource utilization of surrogate may reach a constraint. A first-in first-out (FIFO), least recently used (LRU), or other algorithm can be used to select which minified connections to drop. For the LRU approach, the kernel can employ a timestamp with received messages and measure idle time on each connection to determine which to drop.

In other implementations, it should be noted, the server 200 may close the minified connection regardless of server load or other metrics. For example, the server 200 may just close the minified connection after a configurable time period following the initial decision to put the connection into a minified state.

While the foregoing examples have focused on putting a connection into a minified state, the techniques disclosed herein are also applicable to connection-less protocols. For instance, a server's name server application 208, as is shown in FIG. 2, typically handles UDP traffic for DNS messages. Assume the name server application 208 determines that a particular DNS client or other client is a threat, and that client handling should be delegated to a surrogate. The name server application 208 can provide the kernel 204 with a client identifier (e.g., the client IP address, or in other implementations the client socket). The name server application 208 notifies the kernel of this determination through a system call, and is thereafter to free up memory and other resources devoted to, for example, maintaining application layer state.

The kernel 204 notifies the packet filter of the offending client with the client identifier, and the filter thereafter captures packets from that client. The filter may simply drop such packets, or may respond to them using logic simulating a DNS response. For minified clients of other applications, other types of responses are required to keep the client engaged. Thus to facilitate the functionality for multiple applications (including the name server application 208), the handling application may pass a parameter in the minify system call that indicates the response that the packet filter should give. For example, the name server application 208 can set a parameter in the system call to indicate that the original handling application is a DNS service, which parameter the kernel will give to the packet filter, so that the packet filter knows to respond to incoming packets for that client (or client socket) with a dummy DNS message.

It should be noted that while the packet filter surrogate has been used as a non-limiting example above, any kind of surrogate as previously described can be used with a connection-less protocol implementation.

Further, as suggested above, it may be desirable to thwart all traffic from a particular client (rather than just a particular connection from the client, or a particular client socket). Hence, in some implementations the original handling application (be it the HTTP server application, the name server application, or otherwise) notifies the kernel of the offending client (e.g., via client identifier such as client IP address or set of addresses) and the surrogate then takes over for not just a particular connection/socket but for all connections or traffic from that client.

Use with Proxy Servers and CDNs

Figure 6:
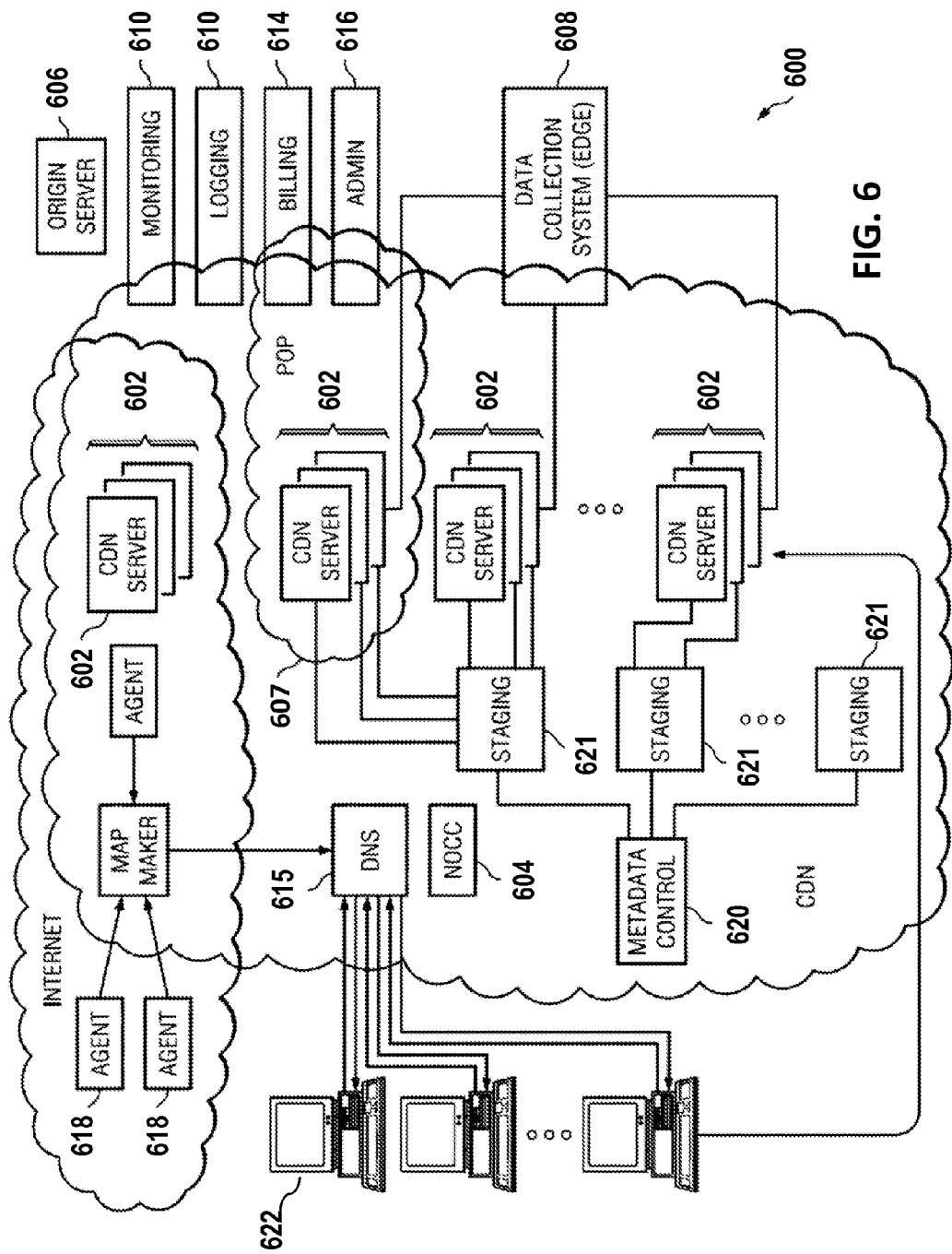
FIG. 6 is a schematic diagram illustrating one embodiment of a known distributed computer system configured as a content delivery network (CDN)
Figure 7:
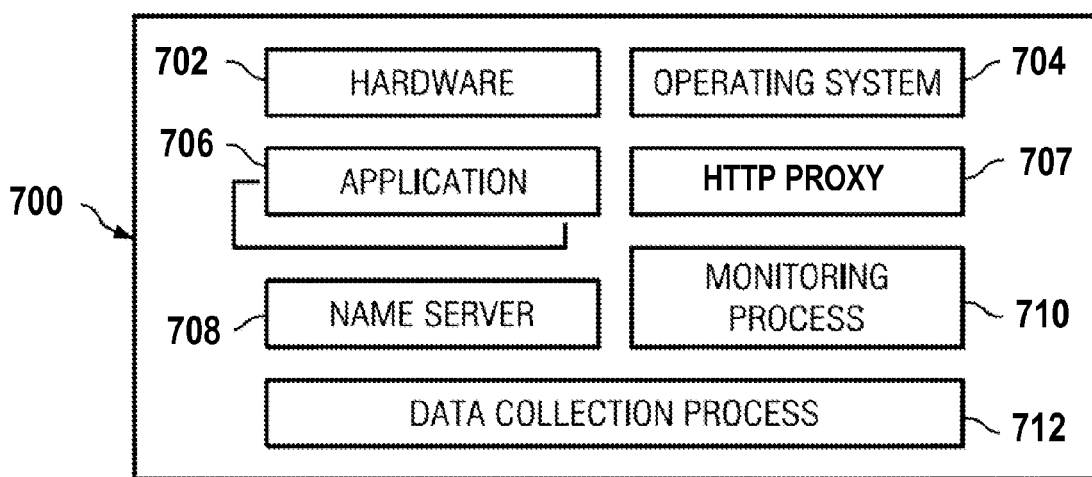
FIG. 7 is a schematic diagram illustrating one embodiment of a machine on which a content delivery network server in the system of FIG. 6 can be implemented; and, FIG. 8 is a block diagram illustrating hardware in a computer system that may be used to implement the teachings hereof.

While in no way limiting, the teachings hereof are advantageously implemented in an HTTP proxy server so that an HTTP server application can minify problematic connections as described above. The HTTP proxy server may be part of a content delivery network (CDN) which is managed by a service provider and offered as a managed delivery service to participating content providers. FIGS. 6-7 illustrate a suitable CDN with a suitable HTTP proxy server application 707 running on machines 700.

As is known in the art, a "content delivery network" or "CDN" is a distributed computer system and is often operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content—such as web pages, streaming media and applications—on behalf of content providers, and ancillary technologies used therewith including, without limitation, DNS query handling, provisioning, data monitoring and reporting, content targeting, personalization, and business intelligence.

In FIG. 6, an exemplary distributed computer system 600 is configured as a content delivery network (CDN) and is assumed to have a set of machines distributed around the Internet. Typically, most of the machines are servers 602 located near the edge of the Internet, i.e., at or adjacent end user access networks. A network operations command center (NOCC) 604 may be used to administer and manage operations of the various machines in the system. Third party sites affiliated with content providers, such as web site 606, offload delivery of content (e.g., HTML, embedded page objects, streaming media, software downloads, and the like) to the distributed computer system 600 and, in particular, to the CDN servers 602 (which are sometimes referred to as "edge" servers in light of the possibility that they are near an "edge" of the Internet). Such servers may be grouped together into a point of presence (POP) 607.

Typically, content providers offload their content delivery by aliasing (e.g., by a DNS CNAME) given content provider domains or sub-domains to domains that are managed by the service provider's authoritative domain name service. End user client machines 622 that desire such content may be directed to the distributed computer system to obtain that content more reliably and efficiently. The CDN servers respond to the client requests, for example by obtaining requested content from a local cache, from another CDN server, from an origin server 606, or other source.

Although not shown in detail in FIG. 6, the distributed computer system may also include other infrastructure, such as a distributed data collection system 608 that collects usage and other data from the CDN servers, aggregates that data across a region or set of regions, and passes that data to other back-end systems 610, 612, 614 and 616 to facilitate monitoring, logging, alerts, billing, management and other operational and administrative functions. Distributed network agents 618 monitor the network as well as the server loads and provide network, traffic and load data to a DNS query handling mechanism 615, which is authoritative for content domains being managed by the CDN. A distributed data transport mechanism 620 may be used to distribute control information (e.g., metadata to manage content, to facilitate load balancing, and the like) to the CDN servers.

As illustrated in FIG. 7, a given machine 700 in the CDN (sometimes referred to as an "edge machine") comprises commodity hardware (e.g., an Intel processor) 702 running an operating system kernel (such as Linux or variant) 704 that supports one or more applications 706a-n. To facilitate content delivery services, for example, given machines typically run a set of applications, such as an HTTP proxy 707, a name server 708, a local monitoring process 710, a distributed data collection process 712, and the like. The HTTP proxy 707 (sometimes referred to herein as a global host or "ghost") typically includes a manager process for managing a cache and delivery of content from the machine. For streaming media, the machine typically includes one or more media servers, such as a Windows Media Server (WMS) or Flash server, as required by the supported media formats.

The machine shown in FIG. 7 may be configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,111,057 illustrates a useful infrastructure for delivering and managing CDN server content control information and this and other content server control information (sometimes referred to as "metadata") can be provisioned by the CDN service provider itself, or (via an extranet or the like) the content provider customer who operates or is otherwise associated with the origin server.

The CDN may include a network storage subsystem (sometimes referred to herein as "NetStorage") which may be located in a network datacenter accessible to the content servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. For live streaming delivery, the CDN may include a live media delivery subsystem, such as described in U.S. Pat. No. 7,296,082, and U.S. Publication No. 2011/0173345, the disclosures of which are incorporated herein by reference.

Use with Mobile Devices and Wireless Networks

The teachings hereof are applicable to machines in mobile operator network environments or transmitting data through such networks. Hence, the client devices referred to above may be not only a conventional desktop, laptop or other Internet-accessible machine running a web browser or other rendering engine, but also may be a mobile device. A mobile device includes any wireless client device, e.g., a cellphone, pager, a personal digital assistant (PDA, e.g., with GPRS network interface card), including a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, LTE, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, the mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. A mobile device may also have support for wireless local area network (WLAN) technologies, such as Wi-Fi. WLAN is based on IEEE 802.11 standards.

Implementation with Computer-Based Technologies

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
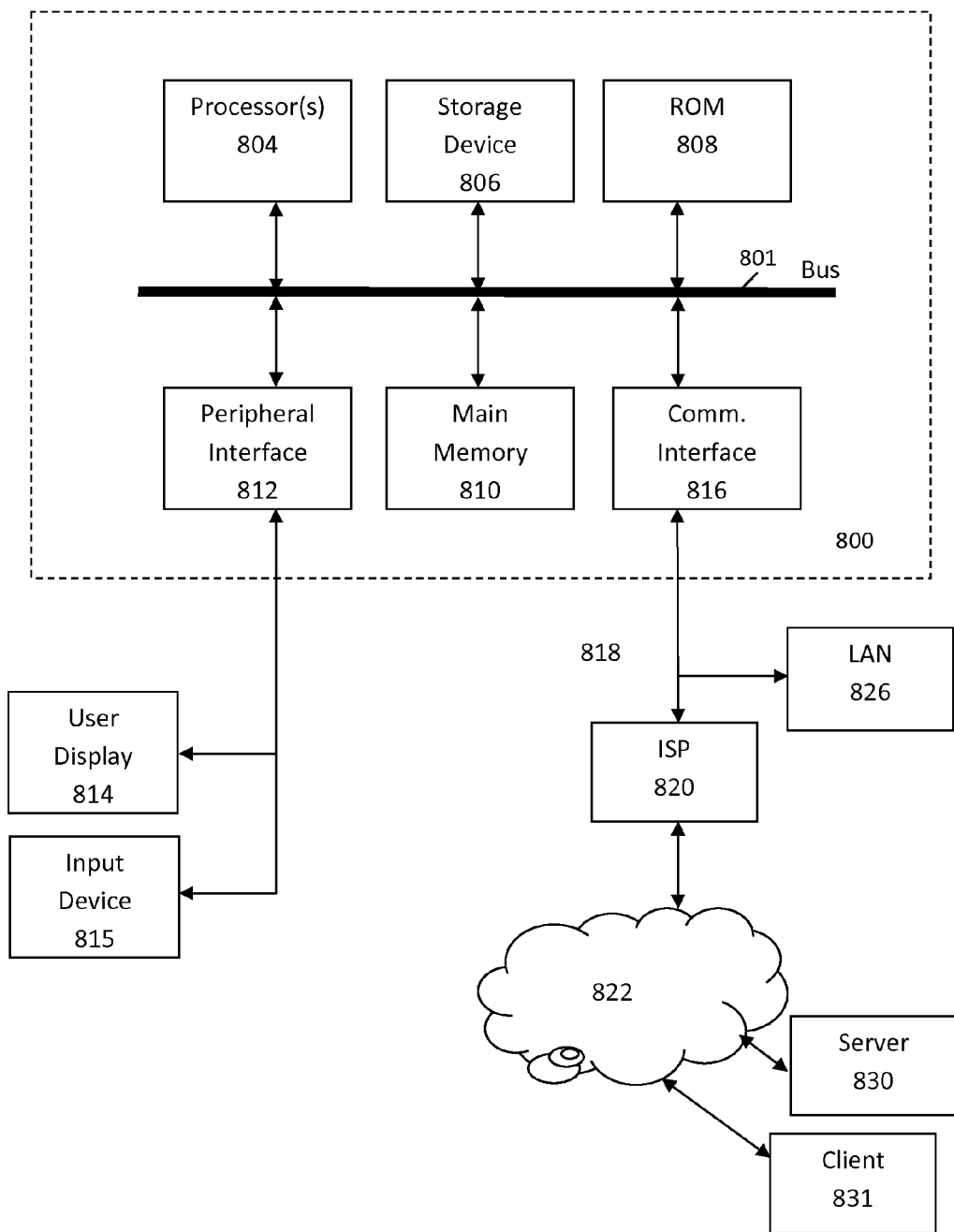

FIG. 8 is a block diagram that illustrates hardware in a computer system 800 upon which such software may run in order to implement embodiments of the invention. The computer system 800 may be embodied in a client device, server, personal computer, workstation, tablet computer, wireless device, mobile device, network device, router, hub, gateway, or other device. Representative machines on which the subject matter herein is provided may be Intel-based computers running a Linux or Linux-variant operating system and one or more applications to carry out the described functionality.

Computer system 800 includes a processor 804 coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. As another form of memory, a non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

Although the computer system 800 is typically managed remotely via a communication interface 816, for local administration purposes the system 800 may have a peripheral interface 812 communicatively couples computer system 800 to a user display 814 that displays the output of software executing on the computer system, and an input device 815 (e.g., a keyboard, mouse, trackpad, touchscreen) that communicates user input and instructions to the computer system 800. The peripheral interface 812 may include interface circuitry, control and/or level-shifting logic for local buses such as RS-485, Universal Serial Bus (USB), IEEE 1394, or other communication links.

Computer system 800 is coupled to a communication interface 816 that provides a link (e.g., at a physical layer, data link layer, or otherwise) between the system bus 801 and an external communication link. The communication interface 816 provides a network link 818. The communication interface 816 may represent a Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 818 (e.g., following storage in an interface buffer, local memory, or other circuitry).

It should be understood that the foregoing has presented certain embodiments of the invention that should not be construed as limiting. It is contemplated that those skilled in the art will recognize other possible implementations in view of this disclosure and in accordance with its scope and spirit. The appended claims are considered to be part of the disclosure of this application. The appended also claims define the subject matter for which protection is sought.

The invention claimed is:

1. A method executed by a server machine interacting with a client over one or more computer communications networks, the method comprising:
   establishing a transport control protocol (TCP) connection with a client over one or more computer communications networks;
   receiving at least one application layer message over the TCP connection from the client with a first program executing in the server machine, the first program comprising an HTTP server application;
   during the time the connection is open, determining that any of the client and the TCP connection exhibits one or more attack characteristics;
   as a result of the determination, the server machine: (a) transitioning responsibility for handling application layer messages arriving via the TCP connection from the first program to a second program, while keeping the TCP connection open, the second program being a user-space application that consumes fewer server machine resources than the first program in handling the application layer messages, and (b) changing its treatment of the TCP connection such that the server machine thereafter:
   (i) sends at least one transport-layer message to the client to keep the TCP connection open, and
   (ii) sends responses to application layer messages from the client with the second program.

2. The method of claim 1, wherein subsequently any of (i) the server machine closes the TCP connection and (ii) the server machine receives a message from the client that closes the TCP connection.

3. The method of claim 1, wherein the determination is based on at least one of client attributes, connection attributes, and client behavior during the TCP connection.

4. A server machine, comprising:
   circuitry forming one or more processors that execute computer-readable instructions;
   memory holding computer-readable instructions for execution by the one or more processors;
   the computer-readable instructions, when executed by the one or more processors, causing the server machine to:
   establish a transport control protocol (TCP) connection with a client over one or more computer communications networks;
   receive at least one application layer message over the TCP connection from the client with a with a first program executing in the server machine, the first program comprising an HTTP server application;
   during the time the TCP connection is open, (a) transition responsibility for handling application layer messages arriving via the TCP connection from the first program to a second program, while keeping the TCP connection open, the second program being a user-space application that consumes fewer server machine resources than the first program in handling the application layer messages, and (b) determine that any of the client and the TCP connection exhibits one or more attack characteristics;
   as a result of the determination, the server machine changing its treatment of the TCP connection such that the server machine thereafter:
   (i) sends at least one transport-layer message to the client over the connection to keep the TCP connection open, and
   (ii) sends responses to application layer messages from the client with the second program.

5. The server machine of claim 4, wherein subsequently any of (i) the server machine closes the TCP connection and (ii) the server machine receives a message from the client that closes the TCP connection.

6. The server machine of claim 4, wherein the determination is based on at least one of client attributes, connection attributes, and client behavior during the connection.

7. The method of claim 1, wherein the at least one transport layer message comprises any of: acknowledgement, keep-alive, sequence number update.

8. The server machine of claim 4, wherein the at least one transport layer message comprises any of: acknowledgement, keep-alive, sequence number update.

9. The method of claim 1, wherein the first program determines that the any of client and TCP connection exhibits one or more attack characteristics, and in response the first program passes a connection identifier to a kernel in the service machine, to identify the TCP connection to be transferred to the second program.

10. The server machine of claim 4, wherein the first program determines that the any of client and TCP connection exhibits one or more attack characteristics, and in response the first program passes a connection identifier to a kernel in the service machine, to identify the TCP connection to be transferred to the second program.

* * * * *